May 27, 1952  T. D. STEWART  2,598,197
CAR MOVER
Filed Oct. 22, 1947  3 Sheets-Sheet 2

INVENTOR
T. Dale Stewart
by his attys.
Stebbins Blenko + Webb

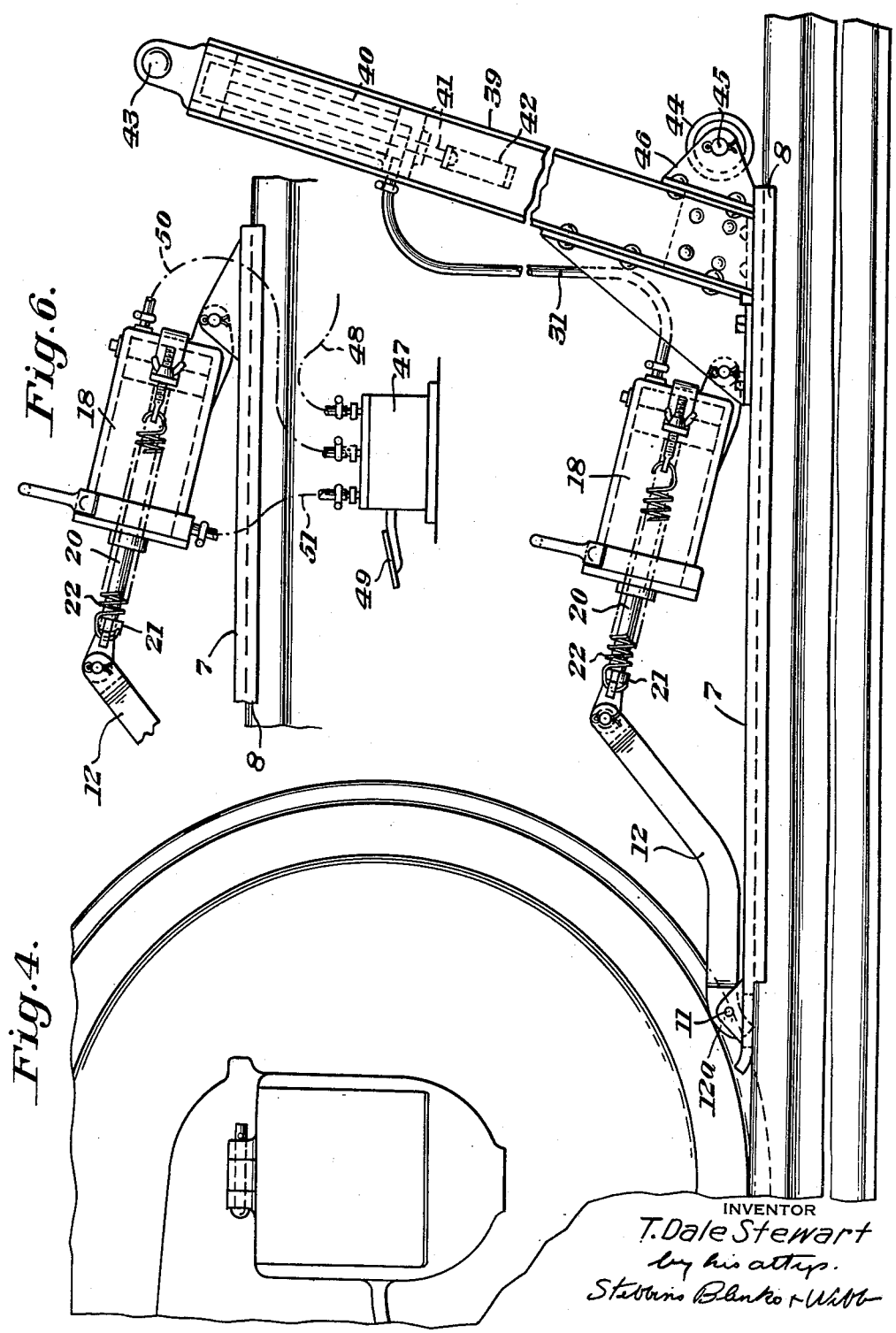

Patented May 27, 1952

2,598,197

UNITED STATES PATENT OFFICE 2,598,197

CAR MOVER

Thomas Dale Stewart, New Kensington, Pa.

Application October 22, 1947, Serial No. 781,470

4 Claims. (Cl. 254—38)

This application relates to a car mover, more particularly to a device for moving railroad cars. It is particularly useful for moving railroad freight cars and therefore it will be described with reference thereto. However it can be used to move any type of a car which rolls on rails.

Frequently, in warehouses, coal mines, loading platforms, etc., it is necessary to move a heavy freight car a short distance in order to "spot" the car in the correct position for loading or unloading. Heretofore, the car has been moved by manpower, that is, two or three men have each placed a crowbar under a wheel of a car and lifted the bars against the wheels to start the car rolling. Another man rides on the car to operate the car brakes. With my invention one man can move a car and at the same time control the car brakes.

Broadly speaking, a car mover made in accordance with my invention comprises a base which rests on one of the rails on which the car to be moved is standing, one end of the base being placed close to one wheel of the car. A lever is pivotally mounted on the base near the end of the base which is adjacent to the wheel. Fluid pressure supplied to a cylinder also mounted on the base actuates a piston in the cylinder. This piston is connected to one end of the lever so that when the piston moves the lever is rotated about its pivot point. Rotation of the lever causes one of its ends to press downwardly against the rail. The lever then pivots about this end and presses against the wheel to turn it. A foot-actuated pump is designed to be hooked onto the car adjacent the car brake wheel. One man can thus supply fluid under pressure to the cylinder on the base and at the same time control the brakes of the car. My car mover also has means for connecting it to a car and holding it in the proper position relative to a car wheel.

In the accompanying drawings I have illustrated certain present preferred embodiments of my invention in which Figure 1 is a front elevation of one form of my car mover showing it in proper working position relative to a car wheel;

Figure 4 is a front elevation of a modified form of my car mover;

Figure 6 is a front elevation of a portion of another modification of my car mover.

A car mover constructed in accordance with my invention comprises a narrow rectangular base 7. The base is at least as wide as the head of a rail and has flanges 8 extending downwardly on each side of the rail head to hold it in position on the rail. One end of the base is turned upwardly as at 9 to prevent the base from catching on rail joints, switch frogs, etc. when it is slid along the rail.

Figure 1:
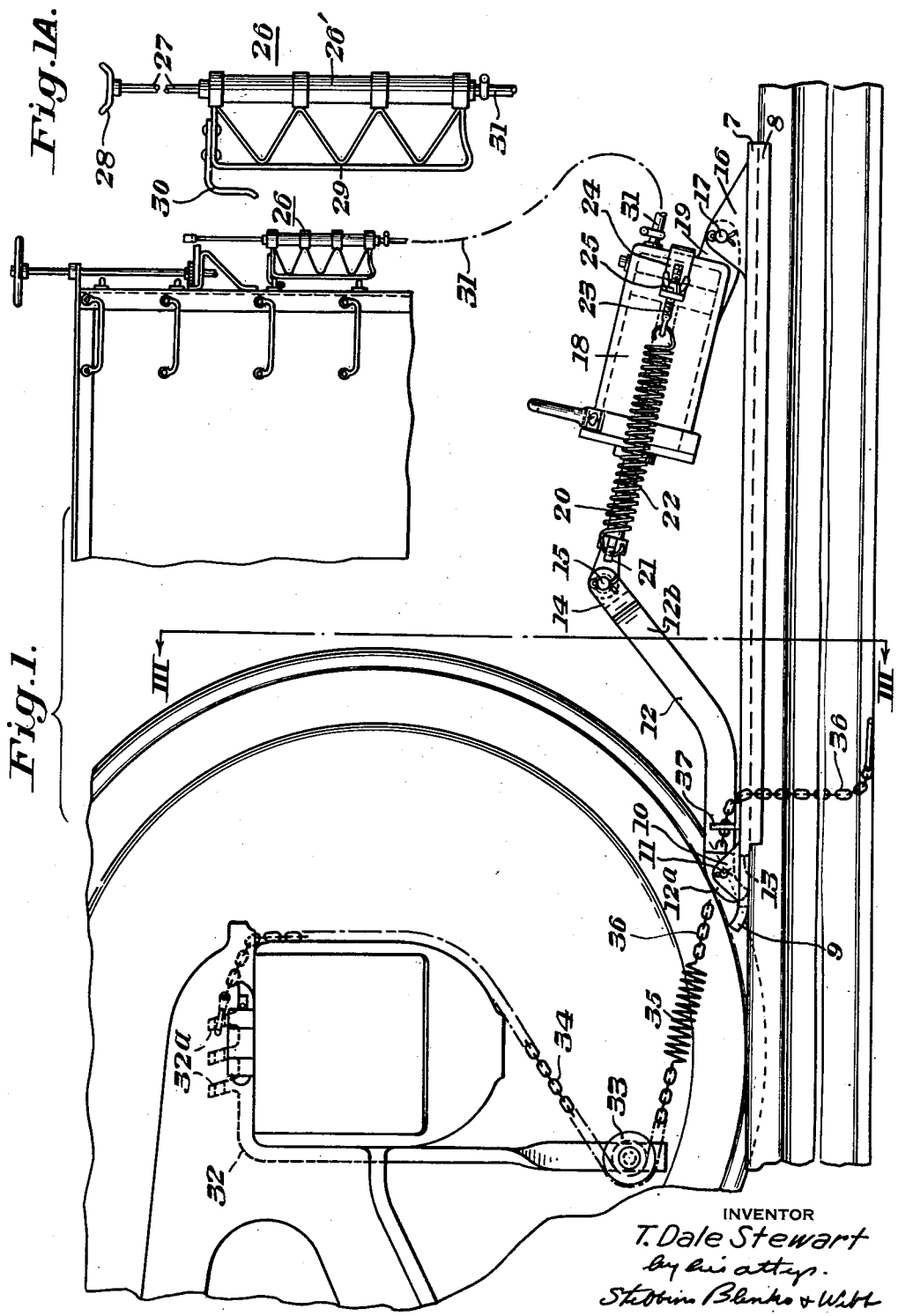
Figure 1A is a front elevation of a foot-actuated pump which may be used to supply fluid under pressure to the car mover.
Figure 2:
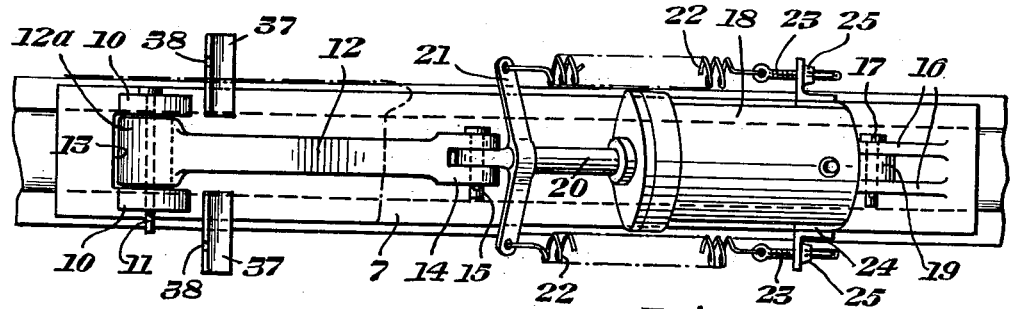
Figure 2 is a plan view of the car mover shown in Figure 1.
Figure 3:
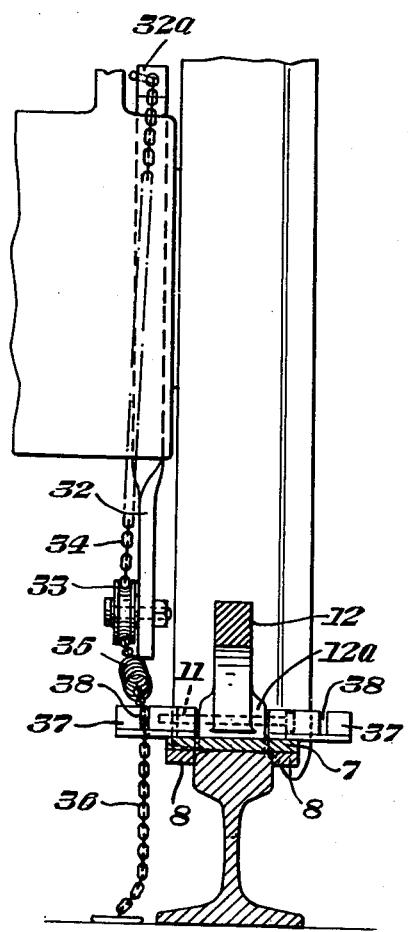
Figure 3 is a section along the lines III—III of Figure 1.
Figure 5:
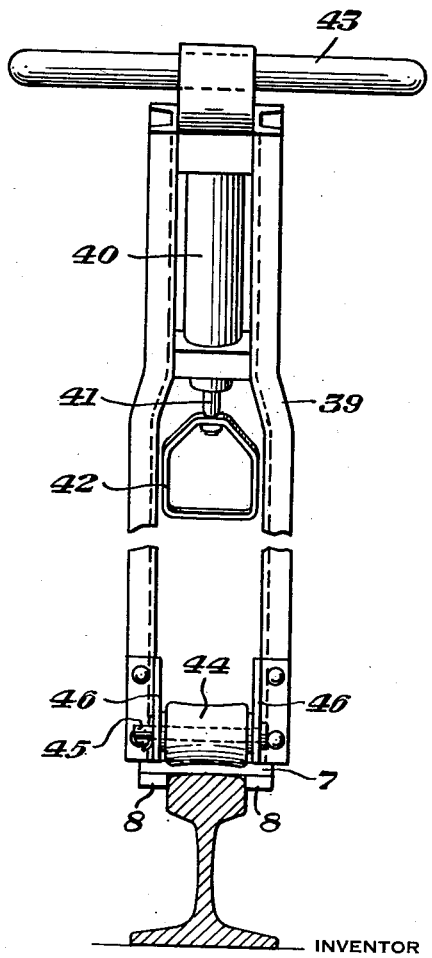
Figure 5 is an end view of the car mover shown in Figure 4.

The base 7 has a pair of ears 10 extending upwardly near the curved end 9. These ears support a pin 11 which extends partly across the base 7. A curved lever 12 is pivoted near one of its ends about the pin 11 and thus has a short arm 12a and a long arm 12b (see Figure 1). The short arm 12a is curved downwardly through a slot 13 in the base 7 so that it extends close to the head of the rail on which the base is placed. As shown in Figure 1 the long arm 12b of the lever 12 extends from the pin 11 for a portion of its length in a direction parallel to the base 7 and is then curved upwardly at an angle of approximately 45°. The end of arm 12b carries a two-pronged fork 14, the prongs of the fork in turn carrying a pin 15.

The other end of the base 7 has two upwardly extending arms 16 which support a pin 17. A cylinder 18 is pivotally mounted on the pin 17 by means of a lug 19. A piston 20 in the cylinder 18 is pivotally connected at its outer end to the lever 12 by the pin 15. A cross arm 21 secured to the piston 20 adjacent its outer end holds one end of each of two coil springs 22. The other ends of the springs are held by bolts 23 which pass through the ends of a strap 24 secured around the end of the cylinder 18. The tension of the springs may be adjusted by turning wing nuts 25 on the bolts 23.

Figure 1A illustrates a pump which may be used to supply fluid under pressure to the cylinder 18. The pump designated generally by the reference number 26 has a cylinder 26′ and a piston 27 of conventional design. The piston carries an upturned stirrup 28 so that the pump can be worked by an operator's foot. A framework 29 is secured to the cylinder 26′ to fasten the pump on a car and to space the pump outwardly from the car to make the stirrup accessible to the operator. The framework 29 carries a hook 30 which may be placed over a rung of the ladder usually provided on the end of freight cars. Figure 1 illustrates how the pump may be placed on a car so that a man standing on the brake platform can operate the car brake wheel and at the same time actuate the pump with his foot. The cylinder 26' and the cylinder 18 are connected by a flexible hose 31.

To operate my car mover it is necessary to place the lever 12 against the car wheel as shown in Figure 1 or close to the wheel before the lever is actuated. Accordingly, I provide an angle or hook 32 which fits across the top and extends down past one side of the journal box next to the car wheel against which my car mover is placed. The downwardly extending arm of the hook carries a pulley 33 at its lower end. A chain 34 is fastened to the arm of the hook which extends across the top of the journal box and is passed down the side and under the journal box around the pulley 33 to one end of a spring 35. A chain 36 is connected to the other end of the spring 35 and is fastened to the base 7 by means of angle members 37 which extend outwardly from each side of the base 7. The angle members 37 have slots 38 into which different links of the chain 36 can be placed to adjust the tension exerted on the spring 35. The chain 34 is passed around the pulley 33 to hold the hook 32 on the journal box and also to exert a pull on the base 7 in a direction making only a small angle with the rail and thus pull the base under the wheel as far as possible. The angle members 37 are provided on both sides of the base 7 so that the car mover can be used on either side of a railroad car. The arm of the hook 32 which extends across the top of the journal box has several vertically extending lugs 32a to each of which the chain 34 may be fastened depending on the size and shape of the journal box to which the hook 32 is secured.

The operation of my car mover is as follows. It is placed on a rail on which the car to be moved is standing so that the arm 12a is against or is close to the rim of one of the car wheels. The hook 32 is fastened to the journal box and the chain 36 is pulled so as to place the spring 35 under tension and to thus resiliently press the arm 12a against the wheel. A link of the chain is placed in the slot 38 of one of the angle members 37 to maintain this tension. The pump is placed on the car as shown in Figure 1. The operator then releases the car brakes and with his foot forces the piston 27 downwardly into the cylinder 26'. Fluid under pressure is thereby transmitted through the hose 31 to the cylinder 18. The piston 20 moves out of the cylinder and rotates the lever 12 counterclockwise about the pin 11. This rotation forces the end of the arm 12a down against the rail, this end then becoming the pivot point of the lever. Continued outward motion of the piston 20 raises the portion of the lever 12 adjacent the pin 11 up against the car wheel causing the wheel to turn and the car to move. At the end of the stroke of the pump the springs 22 return the piston rod 20 into the cylinder 18 which in turn forces the fluid into the pump 26. The pressure of the end of the arm 12a against the rail is also relieved and the spring 35 which has been extended by forward motion of the car draws the lever 12 against or close to the rim of the wheel. The car mover is thus in position for another stroke of the piston. This operation is continued until the car has moved the desired distance.

The diameters of the cylinders 18 and 26' can be adjusted relatively to each other so that a stroke of the piston 27 in the cylinder 26' will cause a full stroke of the piston 20 in the cylinder 18. If this is done the car will be moved a short distance on each stroke of the piston 27 and the car mover will be moved into position for another stroke while the piston 27 is returning to its uppermost position in the cylinder 26'. The relative capacities of the cylinders 26' and 18 can be adjusted so that more than one stroke of the piston 27 is required for a full stroke of the piston 20. If this is done, of course, a check valve will be required somewhere between the cylinder 26' and cylinder 18 so that the springs 21 will not return fluid to the cylinder 26' between strokes. A pressure release valve is also required to release the pressure in the cylinder 18 at the end of a stroke of the piston 20.

If the car can be moved without controlling the brakes or if it is desired to have one man control the brakes and another man move the car a modified form of my car mover such as that shown in Figure 4 may be used. This modified car mover is substantially the same as the mover described above and operates in the same way except that it does not have any means to connect it to the car such as the hook 32, chains 34 and 36, and spring 35 shown in Figure 1. An upright column 39 is mounted on the base 7 on its end near the cylinder 18. This column carries a pump 40 for supplying fluid under pressure to the cylinder 18. The piston 41 of the pump carries a stirrup 42 in which the operator may place his foot and actuate the pump. The top of the column also supports a handle 43 by means of which the operator presses the lever 12 against a wheel of the car to be moved and advances it so as to keep it against the wheel after each stroke of the pump 40. A wheel 44 rotating on a pin 45 supported in brackets 46 which are secured to the column 39 may be used to roll the car mover along the track from one car to another.

Frequently warehouses, coal mines, etc., have available a supply of compressed air for various purposes which supply of compressed air may be used to drive car movers such as I have invented. Figure 6 illustrates the manner in which such a source of compressed air may be utilized. Compressed air is supplied to a standard three-way valve 47 through a hose 48, the valve itself being controlled by a foot lever 49. After the car mover is placed in proper position relative to the wheel of the car to be moved the lever 49 is actuated so as to supply compressed air through the flexible hose 50 to the end of the cylinder 18 near the piston 20 when the piston is in its retracted position. After the piston has completed a full stroke the lever 49 is moved so as to cut off the supply of compressed air to the hose 50 and to cause the air to flow through the flexible hose 51 to the other end of the cylinder thereby forcing the piston 20 back into the cylinder, assisted if need be by the springs 21.

From the foregoing it will be appreciated that with my car mover one man alone can move a freight car and at the same time control the brakes on the car. Heretofore, three or four men have been required to do this same work. My device is relatively light in weight and therefore can readily be moved from one car to another. Little effort is required to attach it to a car. It is simple in construction and operation requiring very little maintenance to keep it in good operating condition.

While I have described certain present preferred embodiments of my invention it is to be understood that it may be otherwise embodied within the scope of the appended claims.

I claim:

1. Apparatus for moving railroad cars comprising a base having an opening therethrough which may be placed on a rail adjacent a wheel of a car to be moved, a lever pivotally mounted on the base, one end of the lever extending through the base, means for rotating the lever about its pivot to press said end against the rail beneath the base and press the portion of the lever adjacent said end against the wheel, thereby causing the wheel to turn.

2. Apparatus for moving railroad cars comprising a base, a lever pivotally mounted on the base whereby rotation of the lever about its pivot engages the rail on which the car to be moved rests, means for holding one end of the lever adjacent the wheel of a car to be moved whereby continued rotation of the lever turns it about its point of contact with the rail and against the wheel to turn it, a cylinder also mounted on the base, a piston moving in the cylinder and connected to the end of the lever away from the wheel, a pump for supplying fluid under pressure to the cylinder to move the piston and rotate the lever, a flexible conduit connecting the pump and the cylinder, and a hook on the pump for securing it to the car.

3. Apparatus for moving railroad cars comprising a base adapted to rest on one of the rails on which a car to be moved stands, a lever pivotally mounted adjacent one of its ends on the base, said lever having a rail engaging portion beyond the pivot point and on the short arm of the lever, means for rotating the lever about its pivot point, whereby rotation of the lever will cause it to first rotate about its pivot point on the base to engage the rail and then about its point of contact with the rail to engage a car wheel and cause it to turn and means for holding the base and the lever pivot point adjacent the car wheel.

4. Apparatus for moving railroad cars comprising a base adapted to rest on one of the rails on which a car to be moved stands, a lever pivotally mounted adjacent one of its ends on the base, said lever having a rail engaging portion beyond the pivot point and on the short arm of the lever, and means for rotating the lever about its pivot point, whereby rotation of the lever will cause it to first rotate about its pivot point on the base to engage the rail and then about its point of contact with the rail to engage a car wheel and cause it to turn.

T. DALE STEWART.

REFERENCES CITED

The following references are of record in the file of this patent:

UNITED STATES PATENTS

| Number | Name | Date |
|---|---|---|
| 62,374 | Siefert | Feb. 26, 1867 |
| 2,207,548 | Morando | July 9, 1940 |
| 2,424,631 | Pierce | July 29, 1947 |

FOREIGN PATENTS

| Number | Country | Date |
|---|---|---|
| 2,815 | Great Britain | Mar. 25, 1893 |
| 486,482 | France | Jan. 15, 1918 |